United States Patent [19]

Sadhir et al.

[11] Patent Number: 4,764,419

[45] Date of Patent: Aug. 16, 1988

[54] CONDUCTIVE HIGH STRENGTH COMPOSITES

[75] Inventors: Rajender K. Sadhir, Plum Boro; Karl F. Schoch, Jr., Wilkins Township, Allegheny County, both of Pa.

[73] Assignee: Westinghouse Electric Corp., Pittsburgh, Pa.

[21] Appl. No.: 809,706

[22] Filed: Dec. 17, 1985

[51] Int. Cl.[4] .......... B32B 27/00

[52] U.S. Cl. .......... 428/290; 427/86; 427/255.6; 427/301; 427/430.1; 428/246; 428/267; 428/268; 428/378; 428/395; 428/902

[58] Field of Search .......... 428/378, 395, 267, 268, 428/290, 902, 246; 427/86, 301, 255.6, 430.1

[56] References Cited

U.S. PATENT DOCUMENTS

| | | | |
|---|---|---|---|
| 4,200,716 | 4/1980 | Pez | 526/141 |
| 4,228,060 | 10/1980 | Pez | 260/30.4 R |
| 4,394,304 | 7/1983 | Wnek | 252/500 |
| 4,411,826 | 10/1983 | Naarmann et al. | 252/518 |

*Primary Examiner*—James J. Bell

*Attorney, Agent, or Firm*—A. Mich, Jr.

[57] ABSTRACT

Disclosed is a process for forming a conductive coating of polyacetylene or substituted polyacetylene on fibers. The fibers are immersed into a solution of a catalyst for the polymerization of acetylene or substituted acetylene. The fibers are removed from the solution and acetylene or substituted acetylene gas is permitted to permeate the fibers, polymerizing to form a polyacetylene coating on the fibers. The coated fibers are then doped to make the polyacetylene coating conductive. Also disclosed are conductive polyacetylene coated fibers and a laminate containing conductive polyacetylene coated fibers.

16 Claims, 3 Drawing Sheets

CONDUCTIVE HIGH STRENGTH COMPOSITES

BACKGROUND OF THE INVENTION

Laminates and composites made with fibrous material embedded in a resinous matrix are normally not conducting or even semiconducting. The addition of conducting fillers to the resinous matrix may increase the conductivity of the laminate or composite, but only if conducting pathways are formed between the filler particles. An article that is completely conducting would require the use of conducting fibers, and most fibers used in making composites and laminates are organic materials, which are insulating. Until now, it has not been possible to produce conducting fibers or semiconducting fibers that have the same strength and other desirable properties that the insulating fibers of organic materials have.

While there are many applications for composites and laminates that are insulating, there is a need for conducting composites and laminates. These could be used for shielding, stress grading, radar absorption, static charge dissipation, and other applications.

SUMMARY OF THE INVENTION

We have discovered that a conductive polyacetylene can be polymerized directly onto fibrous materials. While the conductivity of conductive polyacetylene normally decreases rapidly under ambient conditions, we have found that the conductivity of conductive polyacetylene polymerized onto fibrous materials will stabilize and will not fall after an initial period. Because of this surprising result, we are able to prepare conducting laminates using fibrous material coated with conductive polyacetylene. Unlike previous conducting laminates, the conductivity of which depend upon the formation of a conducting path between the filler particles, in the conducting laminates of this invention the conducting polyacetylene coated fibrous materials provide a conducting path throughout the laminate, making the laminate much more completely conducting.

DESCRIPTION OF THE INVENTION

Figure 1:
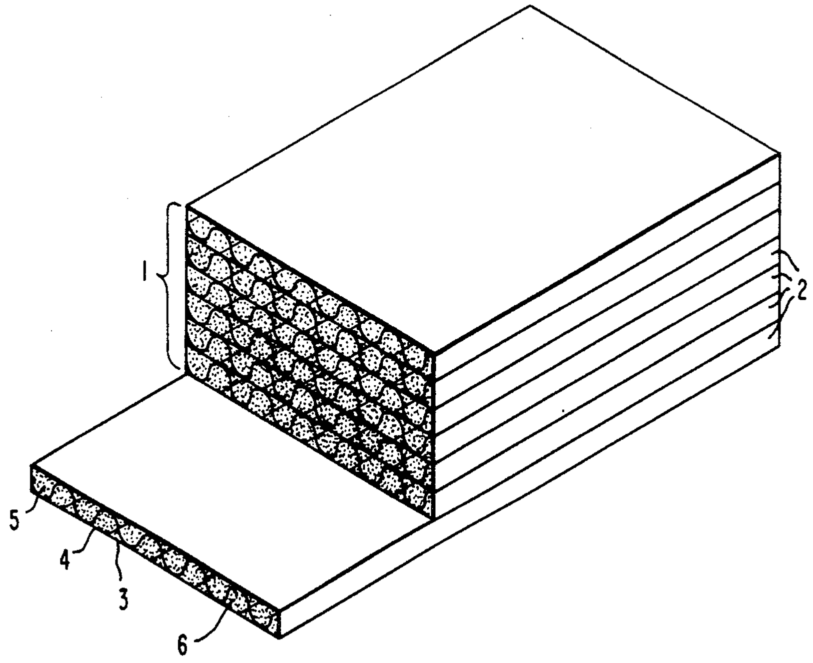
FIG. 1 is an isometric view in section of a certain presently preferred embodiment of a laminate according to this invention.

In FIG. 1, a laminate 1 is formed of a stack of prepregs 2 bonded together under heat and pressure. Each prepreg 2 is formed from a fibrous material 3, having a conductive polyacetylene coating 4 thereover, embedded in a resinous matrix 5 that contains conductive filler particles 6.

Any material that forms a fiber can be used in the process of this invention, including organic polymers, glass, graphite, and boron nitride. Polyaramid fibers are preferred, particularly "Kevlar" fiber (i.e., poly(p-phenylene terephthalamide)), because of its high tensile modulus (20 million psi), high tensile strength (390,000 psi), and low specific gravity (1.44). Also, we have found that chemical grafting probably occurs between the polyacetylene and the "Kevlar" which increases the chemical stability and mechanical properties of the polyacetylene. The fibers may be in any form, including woven, mat, roving, yarn, or fabric, and the fibers may be of any fiber size and of any bulk density.

While not absolutely necessary, it is preferable to soak the fibers in a solution of an acetylene polymerization catalyst. Catalysts for the polymerization of acetylene are well known in the art. Ziegler-Natta catalysts, for example, can be used to polymerize acetylene. These catalysts typically consist of an alkyl aluminum mixed with an alkoxy titanium, such as, for example, tetrabutoxy titanium and triethyl aluminum in a molar ratio of 4:1. Suitable solvents for the catalyst include nonpolar liquids such as toluene and xylene. The catalysts may be dissolved at a concentration of about 10% (all percentages are by weight, based on solution weight, unless otherwise indicated) up to the solubility limit of the catalyst in the solvent. If a lower concentration of catalyst is used the film form of polyacetylene will not be produced. After absorption of the catalyst, the solvent is drained and evacuated or, alternatively, the fibers are simply raised out of the solvent, and the solvent is permitted to remain in the same container.

Both acetylene and substituted acetylenes can be used in the process of this invention. Examples of substituted acetylenes include compounds having the general formula:

$$R—C\equiv C—R$$

where each R is independently selected from hydorgen, alkyl to $C_4$, nitrile, phenyl, $C_6H_5$, and mixtures thereof. Both R groups are preferably hydrogen (i.e., acetylene), because polyacetylene is the most conductive polymer. Polyacetylene exists in both a cis and a trans form, and the transformation between the isomers depends upon the temperature of the polyacetylene as it is formed. The cis form is more desirable because it is more conducting than the trans form; the cis form is formed preferentially when the acetylene is polymerized at less than about $-70°$ C.

Acetylene gas is then pumped container and the polymerization proceeds automatically. The reaction is complete after the pressure of the acetylene gas in the container ceases to fall and a shiny black film is formed on the fibers. Excess acetylene is then removed from the container by vacuum. The polyacetylene coating can be washed with a solvent for the catalyst to remove any catalyst which may be remaining on it.

In the next step of the process of this invention, the polyacetylene is doped to make it conductive. Oxidizing dopants are used to form a p-type semiconductor and reducing dopants are used to form an n-type semiconductor; both types of dopants are well known in the art. Suitable oxidizing dopants include, for example, arsenic pentafluoride, sulfur trioxide, halogens, and quinones. The preferred oxidizing dopant is iodine because it is easy to use, stable, and forms a polyacetylene of high conductivity. Reducing dopants include, for example, alkali metals dissolved in organic solvents. The preferred reducing dopant is sodium because, while it is not stable in oxygen, it forms a polyacetylene of high conductivity. It is preferable to form p-type semiconducting polyacetylene as it is more conducting than the n-type. The dopant can be used as a gas, a liquid, or a solid dissolved in a solvent, as is known in the art. It is preferable to have a molar ratio of dopant to CH groups on the polyacetylene of about 0.1 to about 0.6, as lower ratios are not as conductive and higher ratios are unnecessary.

The resulting product is a semiconducting polyacetylene coating on the fibers. If the fibers are "Kevlar," a resistivity of about 10 to about 20 kilohms can be obtained, and, if the fibers are glass, a resistivity of about 1 kilohm can be obtained, although lower values may be obtainable as techniques improve. A laminate can be prepared from the coated fibers by dipping them into a solution of a polymer, such as an epoxy, a polyester, a polyamide, or other polymer, or in a 100% solids bath of such a polymer. Excess polymer is removed and the impregnated fibers are heated to B-stage the polymer and thereby form a prepreg. A number of prepregs are then stacked and heated under pressure to form a laminate. A conducting filler should be added to the polymer if one desires the resulting product to be as conducting as possible. Suitable conducting fillers include powders of metals such as copper, aluminum, silver, and graphite. It is preferable to form the laminate as soon as possible after formation of the polyacetylene coated fibers so as to avoid losses in conductivity.

Products of any shape and size can be formed from the process of this invention, including flat plates, rods, wires, and other shapes. These can be used as shields for electromagnetic interference or radio frequency interference, as audio or microwave waveguides, and for stress grading, where they are placed between conductors and insulators to reduce electrical stress on insulation. They are also useful as radar absorbing materials and radar absorbing structures because they do not reflect radar well. They can provide shielding for both electronic instrumentation and for power cables, and are useful for static charge dissipation.

The following examples further illustrate this invention.

EXAMPLE I

"Kevlar" fabric was soaked in a 20% solution in toluene of triethyl aluminum for two days in a glove box in order to obtain the penetration of the catalyst into the swollen polymeric fibers. Tetrabutoxy titanium was added to form a 4:1 molar ratio with the triethoxy aluminum, and the catalyst solution was then aged at room temperature for about 30 minutes, and then at −78° C. for 90 minutes. The toluene was then removed by evacuation and acetylene gas was added. The acetylene was either passed through a −78° C. trap before entering the reactor or it was collected in a bulb beforehand and purified by freeze-pump- thaw cycles. The excess acetylene was then pumped out, and the reactor held under dynamic vacuum for one to two hours at −78° C. After warming to room temperature, the catalyst solution was removed by syringe and the film rinsed with toluene freshly distilled from sodium-benzophenone until the rinses were clear.

The resulting polyacetylene coated fibers were doped with iodine by loading the sample into a three-neck flask in the glove box and attaching it to a nitrogen line. Iodine crystals were added to the flask and doping was allowed to proceed over 24 hours at room temperature. After the reaction was complete, the iodine crystals were removed from the flask by evacuation for 1–2 hours. This procedure produced a doped polyacetylene having a ratio of iodine to CH groups of approximately 0.5. The resulting doped polyacetylene coating on the fabric changed from its original silver color to a metallic black color, and the fabric appeared to be completely covered with metallic black polyacetylene. The "Kevlar"-polyacetylene coated fabric was mechanically durable and resisted attempts to break it apart. Based on changes in weight, the coated fabric contained 16% by weight polyacetylene.

Figure 2:
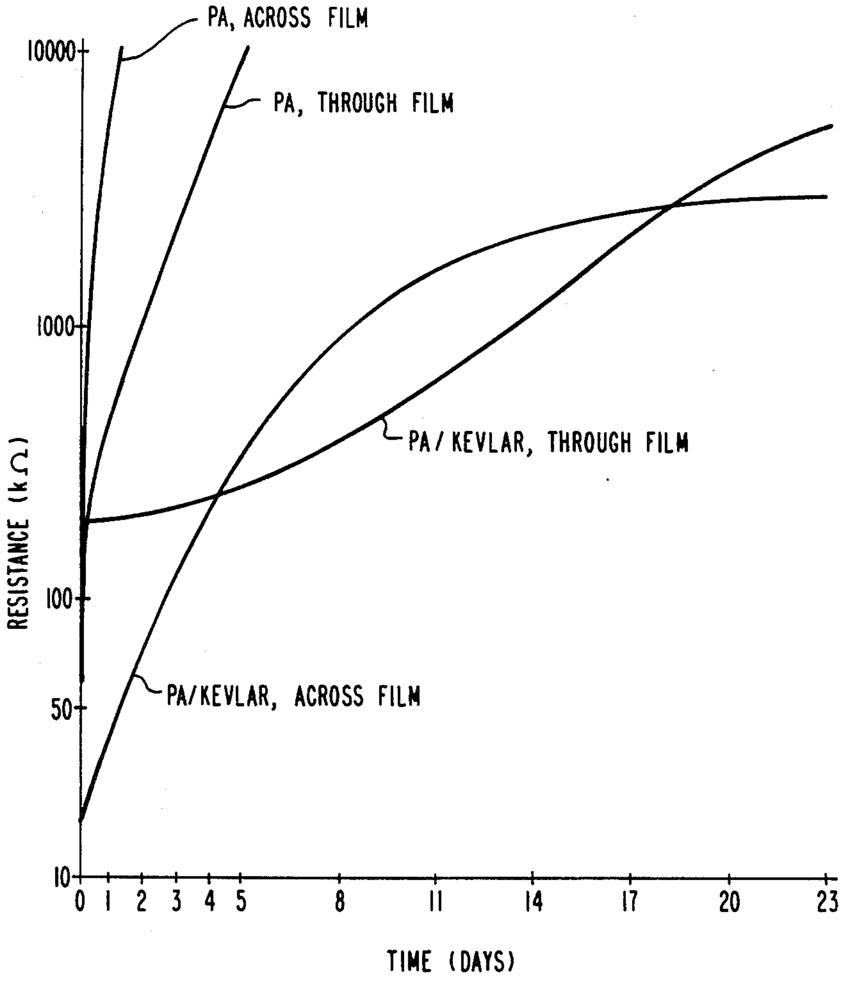
FIGS. 2 and 3 are graphs which give the resistance over time of various samples of films and laminates, the preparation of which is described in the Examples that follow.

Electrical resistance of the coated fabric was measured in two ways: (1) along one surface and (2) through the surface, over a period of several weeks in the laboratory atmosphere at room temperature. Polyacetylene also formed as a film on top of the solution and that film was collected and doped. FIG. 2 gives the results of these tests. As is clear from FIG. 2, the polyacetylene films lost their conductivity in less than five days. In striking contrast, the resistance of the doped polyacetylene"Kevlar" composite samples did not increase nearly as fast as the doped thermopolymer, and reached a steady state value of about two to about five megaohms after 20 days. By judicious selection of dopant and dopant conditions we believe that it is possible to lower the resistance and increase the long term stability of the polyacetylene"Kevlar" composite even further.

It is particularly interesting to note that the resistance through the bulk of the sample was no higher than the resistance measured along one surface. That fact suggests that, in addition to merely coating the "Kevlar" fabric, grafting of the polyacetylene to the backbone of the poly(p-phenylene terephthalamide) fabric has also occurred. While we do not wish to be bound by any theories, we believe that the titanium-aluminum catalyst in the toluene was coordinated into the amine group in the "Kevlar" backbone during the preliminary immersion of the fabric in the catalyst solution. The polyacetylene would, therefore, be grafted to the nitrogen sites of the "Kevlar" backbone. Because the polyacetylene chains are chemically bonded into the "Kevlar" matrix, they are protected from environmental attack and therefore the conductivity did not decrease as rapidly as it did for polyacetylene that was not coated onto "Kevlar". Scanning electron micrographs of the polyacetylene-"Kevlar" blends showed that the polyacetylene formed a coating on the fabric as well as through the fabric.

EXAMPLE II

Figure 3:
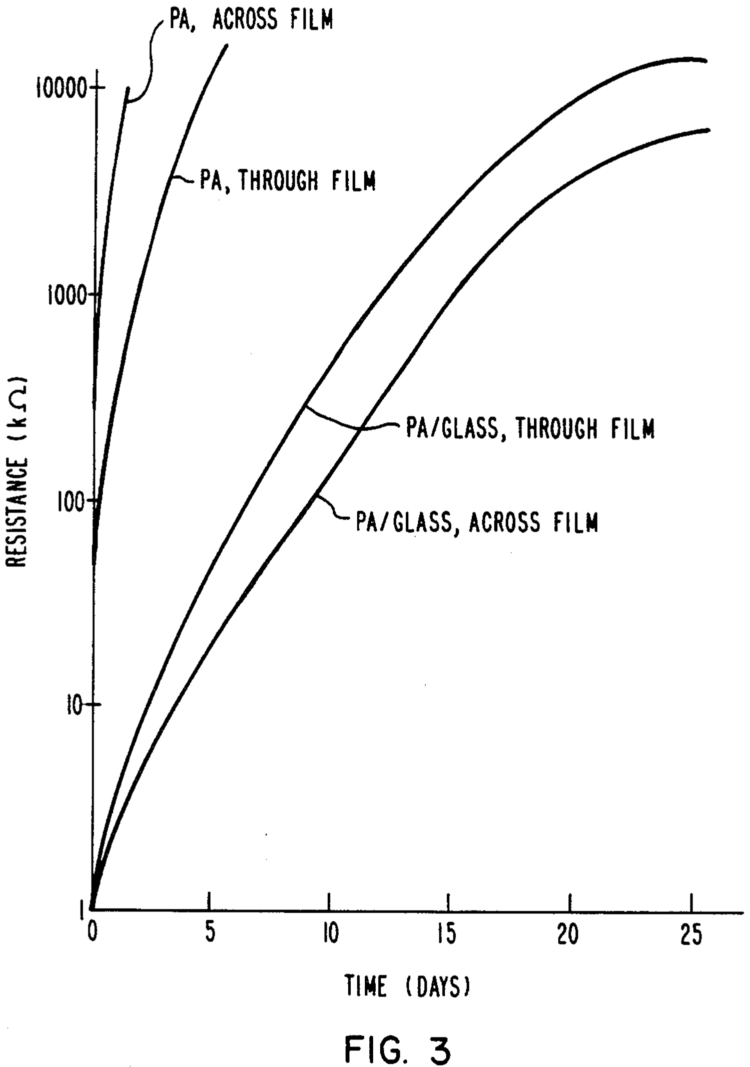

Example I was repeated using glass fabric (7628) and individual glass fibers instead of "Kevlar" fabric. FIG. 3 is similar to FIG. 2, and gives the stability of the polyacetylene glass deposits compared to polyacetylene by itself. As FIG. 3 shows, the resistance of the polyacetylene glass is much more stable than the pure polyacetylene films by themselves both across and through the film. Polyacetylene coated the fabrics and also passed through the weaves of the fabric.

EXAMPLE III

Example I was repeated using graphite fabric instead of "Kevlar" fabric. The initial resistance of the fabric was approximately 14 ohms. After blending with polyacetylene and doping, the resistance decreased by an order of magnitude. The resistance of the blend increased initially on exposure to ambient conditions, but stabilized after $1\frac{1}{2}$ days.

We claim:

1. A method of making a semiconducting polyacetylene coating on fibers comprising:

(1) immersing said fibers into a solution of a catalyst for the polymerization of acetylene;

(2) removing said fibers from said solution;

(3) exposing said fibers to a gas selected from the group consisting of acetylene, substituted acetylene, and mixtures thereof; and (4) contacting polyacetylene formed on said fibers with a dopant.

2. A method according to claim 1 wherein said gas has the general formula R—C≡C—R, where each R is independently selected from hydrogen, alkyl to $C_4$, nitrile, phenyl, and mixtures thereof.

3. A method according to claim 1 wherein said gas is acetylene.

4. A method according to claim 1 wherein said fabric is a polyaramid.

5. A method according to claim 4 wherein said polyaramid is poly(p-phenylene terephthalamide).

6. A method according to claim 1 wherein said catalyst is a solution of an alkyl aluminum and an alkoxy titanium.

7. A method according to claim 6 wherein said alkyl aluminum is triethyl aluminum and said alkoxy titanium is tetrabutoxy titanium, and they are in a molar ratio of about 1 to about 4, in a solution of a nonpolar liquid at a concentration of about 10% up to their solubility limit.

8. A method according to claim 1 wherein said fibers are cooled to less than −70° C. prior to the admission of said acetylene gas in order to form the cis form of polyacetylene.

9. A method according to claim 1 wherein said dopant is a p-type dopant.

10. A method according to claim 9 wherein said dopant is iodine.

11. A method according to claim 1 wherein said dopant is an n-type dopant.

12. A method according to claim 11 wherein said dopant is sodium.

13. A method according to claim 1 when the molar ratio of said dopant to the CH groups in said polyacetylene is about 0.1 to about 0.6.

14. A method according to claim 1 including an additional last step of immersing said coated fibers in a polymerizable organic compound, or solution thereof, removing said fibers therefrom, heating to the B-stage to form a prepreg, forming a stack of said prepregs, and heating said stack under pressure to form a laminate.

15. Fibers coated with conductive polymers selected from a group consisting of polyacetylene, substituted polyacetylene, and mixtures thereof.

16. The laminate comprising coated fibers according to claim 15 impregnated within a cured matrix of an organic polymeric material.

* * * * *